April 17, 1928.
C. BOUILLON
1,666,484
CLAMPING MECHANISM FOR MACHINE TOOLS
Filed June 3, 1926
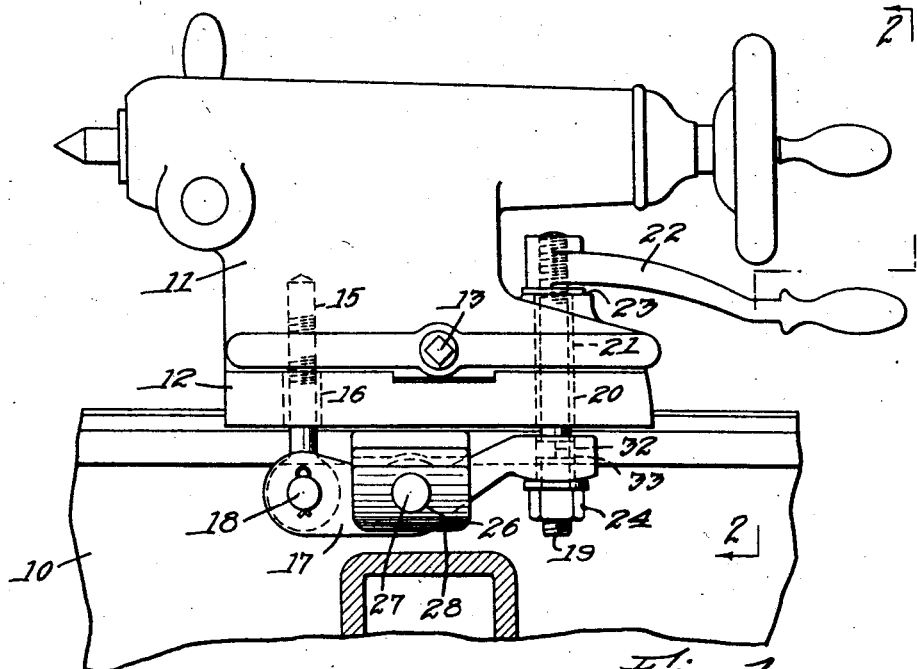
Fig. 1.
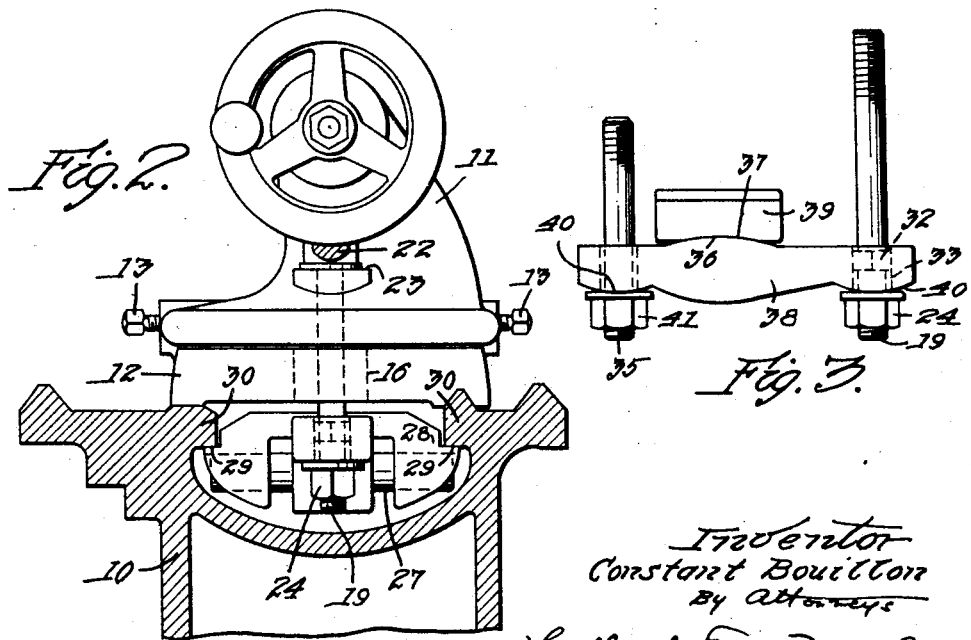
Fig. 2.
Fig. 3.
Inventor
Constant Bouillon
By Attorneys Patented Apr. 17, 1928.

1,666,484

UNITED STATES PATENT OFFICE.

CONSTANT BOUILLON, OF TORRINGTON, CONNECTICUT, ASSIGNOR TO THE HENDRY MACHINE COMPANY, OF TORRINGTON, CONNECTICUT, A CORPORATION OF CONNECTICUT.

CLAMPING MECHANISM FOR MACHINE TOOLS.

Application filed June 3, 1926. Serial No. 113,574.

This invention relates to means for clamping movable units to a machine tool bed, examples of such units being the tail stock or turret head of an engine lathe.

It is the general object of my invention to provide improved mechanism for clamping such units to the machine bed, so designed that the mechanism will be easy and rapid in operation and powerful and positive in its clamping action.

A further object is to provide a clamping mechanism which will apply an even pressure to the movable unit and which will hold the same in a desired position without displacement or distortion due to unevenly applied clamping pressure.

My improved construction is also convenient in operation and is easily adapted to variations in the design of the movable unit or of the machine tool bed.

My invention further relates to arrangements and combinations of parts which will be hereinafter described and more particularly pointed out in the appended claims.

A preferred form of the invention is shown in the drawings, in which

Fig. 1 is a side elevation, partly in section, of portions of a lathe bed and tail stock, with my invention applied thereto;

Fig. 2 is a sectional end elevation, taken along the line 2—2 in Fig. 1; and

Fig. 3 is a side elevation of a modified construction to be described.

Referring to the drawings, I have shown a portion of the bed 10 of an engine lathe or other machine tool, and a tail stock or other movable unit 11 slidably mounted in guideways thereon. I have also indicated the tail stock 11 as being formed in two portions, the upper portion being transversely adjustable upon a base block 12 and being adjustable transversely of the lathe bed by the usual adjusting screws 13 (Fig. 2).

An eye bolt 15 is threaded into the under side of the tail stock 11 and extends downward through a slot 16 in the base plate 12 to a position within the bed or frame 10 as indicated in Fig. 1.

A clamping lever 17 is forked at one end, which end is pivotally connected to the eye bolt 15 by a cross pin 18. At its opposite end the lever 17 is recessed to receive a threaded stud 19 which extends up through a slot 20 in the base plate 12 and through an aligned opening 21 in the tail stock, as indicated in Fig. 1.

The upper end of the stud 19 is threaded to receive a correspondingly threaded handle 22 which engages a supporting shoulder 23 on the tail stock. A nut 24 is threaded on the lower end of the stud 19 and supports the swinging end of the clamping lever 17. The stud 19 is provided with a non-circular portion 32 (Fig. 3) and the recess 33 in the end of the lever 17 is correspondingly non-circular, so that the stud 19 cannot rotate with the handle 22.

The threaded connection between the upper end of the stud 19 and the handle 22 is preferably formed with double threads or with threads of relatively steep pitch, so that a limited movement of the handle will cause a substantial vertical movement of the stud 19. The clamping lever 17 is provided with an opening 26 mid-way of its length for a cross pin 27 on which is pivotally mounted a clamping member 28. The member 28 is provided with shoulders 29 at its outer ends, engaging the under sides of flanges 30 on the frame 10.

Having described one form of my invention, the operation and advantages thereof are as follows:

The handle 22 is pushed rearward to inoperative position, and the nut 19 is then adjusted to bring the clamping member 28 closely adjacent the shoulders 29 but still free therefrom. If necessary, the eye bolt 15 may be adjusted vertically in the tail stock 11 to secure the desired relation of the parts.

When it is desired to clamp the parts in position, the handle 22 is pulled forward, exerting upward pressure on the stud 19 and swinging the clamping lever 17 about its pivot 18. This forces the clamping member 28 against the flanges 30 of the bed 10, the leverage multiplying the pressure applied by the handle and drawing both ends of the tail stock firmly against the guideways on the bed.

The modified construction shown in Fig. 3 is quite similar to that previously described, but substitutes a straight stud 35 for the eye bolt 15 and provides convex and concave bearing surfaces 36 and 37 between the clamping lever 38 and clamping member 39, in place of the pivoted cross shaft construction shown in Figs. 1 and 2. Convex portions 40 are provided at each end of the lever 38, for engagement by nuts 41 and 24 on the studs 35 and 19.

The operation of this form of my invention is substantially similar to that previously described and the invention in either form has been found entirely effective in providing an even but powerful clamping pressure for securing a tail stock or other movable unit in a desired position on the guide-ways of a machine tool.

Having thus described my invention and the advantages thereof, I do not wish to be limited to the details herein disclosed, otherwise than as set forth in the claims, but what I claim is:—

1. In a machine tool, a frame, a machine tool unit movably mounted thereon, a lever pivoted to said unit, a clamping member supported by said lever and engaging said frame, and means on said movable unit to apply clamping pressure to said lever.

2. In a machine tool, a frame, a machine tool unit movably mounted thereon, a lever pivoted to said unit, a clamping member supported by said lever and engaging said frame at two separated points, and means on said movable unit to apply clamping pressure to said lever.

3. In a machine tool, a frame, a machine tool unit movably mounted thereon, a pivot member adjustably secured to said unit, a clamping lever pivoted on said pivot member and having separate frame engaging elements associated therewith, an actuating rod connected to said lever, and means to give said actuating rod an axial clamping movement.

4. In a machine tool, a frame, a machine tool unit movably mounted thereon, a clamping lever pivotally supported below said movable unit and operative against lower clamping surfaces of said frame, and means to exert clamping pressure on said lever, said means comprising a threaded lifting rod non-rotatably connected to said lever and an operative member threaded on the upper end of said rod.

5. In a machine tool, a frame, a machine tool unit movably mounted thereon, a clamping lever pivotally supported below said movable unit and operative against clamping surfaces of said frame, and means to exert clamping pressure on said lever, said means comprising a lifting rod having a non-circular portion extending through a non-circular recess in said lever and said rod extending upward through a portion of said movable unit, a nut threaded on said rod below said lever, and an operating member threaded on the upper end of said lifting rod.

6. In a machine tool, a frame, a machine tool unit movably mounted thereon and comprising upper and lower members constructed for relative transverse adjustment, a clamping lever, supporting means for said lever on said upper member, said lever having an associated clamping element positioned below suitable clamping surfaces on said frame, and operating means on said upper member effective to apply clamping pressure to said lever in every transversely adjusted relative position of said upper and lower machine tool unit members.

7. In a machine tool, a frame, a machine tool unit movably mounted thereon and comprising upper and lower members constructed for relative transverse adjustment, a clamping lever, supporting means for said lever on said upper member, said lever having an associated clamping element positioned below suitable clamping surfaces on said frame, and operating means on said upper member effective to apply clamping pressure to said lever in every transversely adjusted relative position of said upper and lower machine tool unit members, said lower member being recessed to clear said supporting and operating means in every transverse position of said member.

8. In a machine tool, a frame, a machine tool unit movably mounted thereon, a clamping lever, means to support one end of said lever on said movable unit, means to apply clamping pressure at the opposite end of said lever, and a frame-engaging element connected with and actuated by said lever between said end portions.

9. In a machine tool, a frame, a machine tool unit movably mounted thereon, a clamping lever, means to support said lever on said movable unit, means to apply clamping pressure thereto, and a frame-engaging element actuated by said lever, said lever and said frame-engaging element having co-operating portions.

10. In a machine tool, a frame, a machine tool unit movably mounted thereon, a clamping lever, means to support said lever on said movable unit, means to apply clamping pressure thereto, and a frame-engaging element actuated by said lever, said engaging element being arched to pass over said lever and being pivoted thereto at each side thereof.

11. In a machine tool, a frame, a machine tool unit movably mounted thereon, a clamping lever, means to support said lever on said movable unit, means to apply clamping pressure thereto, and a frame-engaging element actuated by said lever, said lever and said frame-engaging element having cooperating convex and concave engaging surfaces.

12. In a machine tool, a frame, a machine tool unit movably mounted thereon, a clamping lever pivotally supported below said movable unit and operative against clamping surfaces of said frame, and means to exert clamping pressure on said lever, said means comprising a threaded lifting rod non-rotatably connected to said lever, and an operative member threaded on the upper end of said rod, said actuating rod and said operating member having quick-acting co-operating screw threads.

13. In a machine tool, a frame, a machine tool unit movably mounted thereon, a clamping lever pivotally supported below said movable unit and operative against clamping surfaces of said frame, and means to exert clamping pressure on said lever, said means comprising a threaded lifting rod non-rotatably connected to said lever, and an operative member threaded on the upper end of said rod, said threaded rod being angularly adjustable but non-rotatable in said lever.

14. In a machine tool, a frame, a machine tool unit movably mounted thereon, a pivot eye bolt adjustably threaded in said unit, a lever pivoted thereto and having provision for engaging said frame, a lifting rod engaging said lever, and manual means to move said rod vertically to clamp or release said lever.

15. In a machine tool, a frame, a machine tool unit movably mounted thereon, a clamping lever mounted below said unit and having a plurality of associated frame-engaging elements, and means to apply upward pressure to said lever and simultaneously exert downward pressure on said movable unit near both ends thereof.

In testimony whereof I have hereunto affixed my signature.

CONSTANT BOUILLON.

CERTIFICATE OF CORRECTION.

Patent No. 1,666,484.  Granted April 17, 1928, to

CONSTANT BOUILLON.

It is hereby certified that the name of the assignee in the above numbered patent should have been written and printed as "The Hendey Machine Company" instead of "The Hendry Machine Company, as shown by the records of assignments in this office; and that said Letters Patent should be read with this correction therein that the same may conform to the record of the case in the Patent Office.

Signed and sealed this 7th day of August, A. D. 1928.

(Seal)

M. J. Moore,
Acting Commissioner of Patents.